United States Patent [19]

Kaneko et al.

[11] Patent Number: 4,768,449
[45] Date of Patent: Sep. 6, 1988

[54] CULTIVATOR WITH SUPPORTING APPARATUS MOVABLE TO STORED POSITION

[75] Inventors: Takuji Kaneko; Akira Sasai, both of Numazu; Tomoo Taguchi; Hirofumi Kayahara, both of Okayama, all of Japan

[73] Assignees: Fuji Robin Kabushiki Kaisha, Tokyo; Kobashi Kogyo Co. Ltd., Okayama, both of Japan

[21] Appl. No.: 855,999

[22] Filed: Apr. 24, 1986

[30] Foreign Application Priority Data

May 1, 1985 [JP] Japan .................................. 60-94437
May 1, 1985 [JP] Japan .................................. 60-94438

[51] Int. Cl.[4] ...................... A01C 23/02; A01B 63/02
[52] U.S. Cl. ...................................... 111/7; 172/240; 172/427; 280/475
[58] Field of Search ...................... 172/240, 427, 776; 111/6, 7, 7.1, 7.2, 7.3, 7.4; 280/475

[56] References Cited

U.S. PATENT DOCUMENTS

| | | | |
|---|---|---|---|
| 3,039,633 | 6/1962 | Mindrum et al. | 280/475 X |
| 3,281,160 | 10/1966 | Vinther et al. | 280/475 X |
| 3,306,629 | 2/1967 | Oerman et al. | 280/475 |
| 3,403,737 | 10/1968 | Byrd | 172/427 X |
| 3,559,747 | 2/1971 | Cline | 172/427 X |
| 3,895,589 | 7/1975 | Garner et al. | 111/7 |
| 3,967,564 | 7/1976 | Emling | 111/7 |
| 4,294,181 | 10/1981 | Smith | 111/7 X |

FOREIGN PATENT DOCUMENTS

| | | | |
|---|---|---|---|
| 59-42801 | 3/1984 | Japan | 111/7 |
| 848363 | 9/1960 | United Kingdom | 280/475 |
| 934938 | 6/1982 | U.S.S.R. | 111/7 |

Primary Examiner—Richard T. Stouffer
Attorney, Agent, or Firm—Martin A. Farber

[57] ABSTRACT

A cultivator has a blade secured to a frame. The blade is downwardly projected from the frame and has an edge at the forward side thereof. An air injector is provided at a lower portion of the blade. The frame is supported with the blade and the injector above the ground by a pair of supporting wheels and a stand which are changeable to a criss-crossed stored position to permit the cultivator to be moved downwardly to its operative position.

5 Claims, 4 Drawing Sheets

CULTIVATOR WITH SUPPORTING APPARATUS MOVABLE TO STORED POSITION

BACKGROUND OF THE INVENTION

The present invention relates to an apparatus for supporting a cultivator on the ground, the cultivator having a blade which cultivates the soil with air injected from a nozzle or injector provided on a lower portion of the blade which is forced into the soil and forwardly moved by a tractor.

One type of such a cultivator is disclosed in Japanese Patent Laid-Open No. 59-42801. The cultivator is provided with a longitudinal frame, a blade having a pipe attached to the rear and an injector at the lower portion thereof, a main tank and a sub-tank for temporarily storing compressed air disposed above the blade. Compressed air in the main tank is intermittently injected into the soil by way of the sub-tank. On the rear end of the frame behind the blade, a gauge wheel is provided for supporting the cultivator on the ground when the injector is inserted into the ground.

However, as the gauge wheel is provided at the rear side of the cultivator at a position away from the blade, the weight of the machine is greatly exerted on the gauge wheel during operation. Accordingly, the cultivator is apt to sink at the rear causing not only an increase of tractional resistance but also damage to the injector. The depth of the injector can not be accurately adjusted since the gauge wheel is disposed away from the blade. When the cultivator is not operated, the cultivator is supported by the blade, putting the blade on the surface of the ground. Therefore, the injector is liable to be damaged. In addition, since there is no supporting means, the attachment operation of the cultivator to the tractor must be done by at least two persons, supporting the cultivator.

SUMMARY OF THE INVENTION

The object of the present invention is to provide an apparatus for supporting a cultivator which may keep a blade at a proper depth in the soil and may preventing the cultivator from falling.

According to the present invention, there is provided an apparatus for supporting a cultivator having a frame, a linkage for connecting the frame to a tractor, at least one blade secured to the frame, the blade being downwardly projected from the frame and having an edge at the forward side thereof, an injector provided at a lower portion of the blade, and a passage for supplying compressed air to the injector for injecting the compressed air into the soil.

The apparatus comprises a pair of supporting wheels provided adjacent to the edge of the blade, and means for changing the vertical position of the supporting wheels.

In an aspect of the invention, each of the supporting wheels is provided on a rotatable supporting arm, and comprises extensible screw means and a handle for operating the screw means.

Further the apparatus has at least one stand provided on the frame so as to be retracted to an upper position.

The other objects and features of this invention will become understood from the following description with reference to the accompanying drawings.

DETAILED DESCRIPTION OF THE PREFERRED EMBODIMENT

Figure 1:
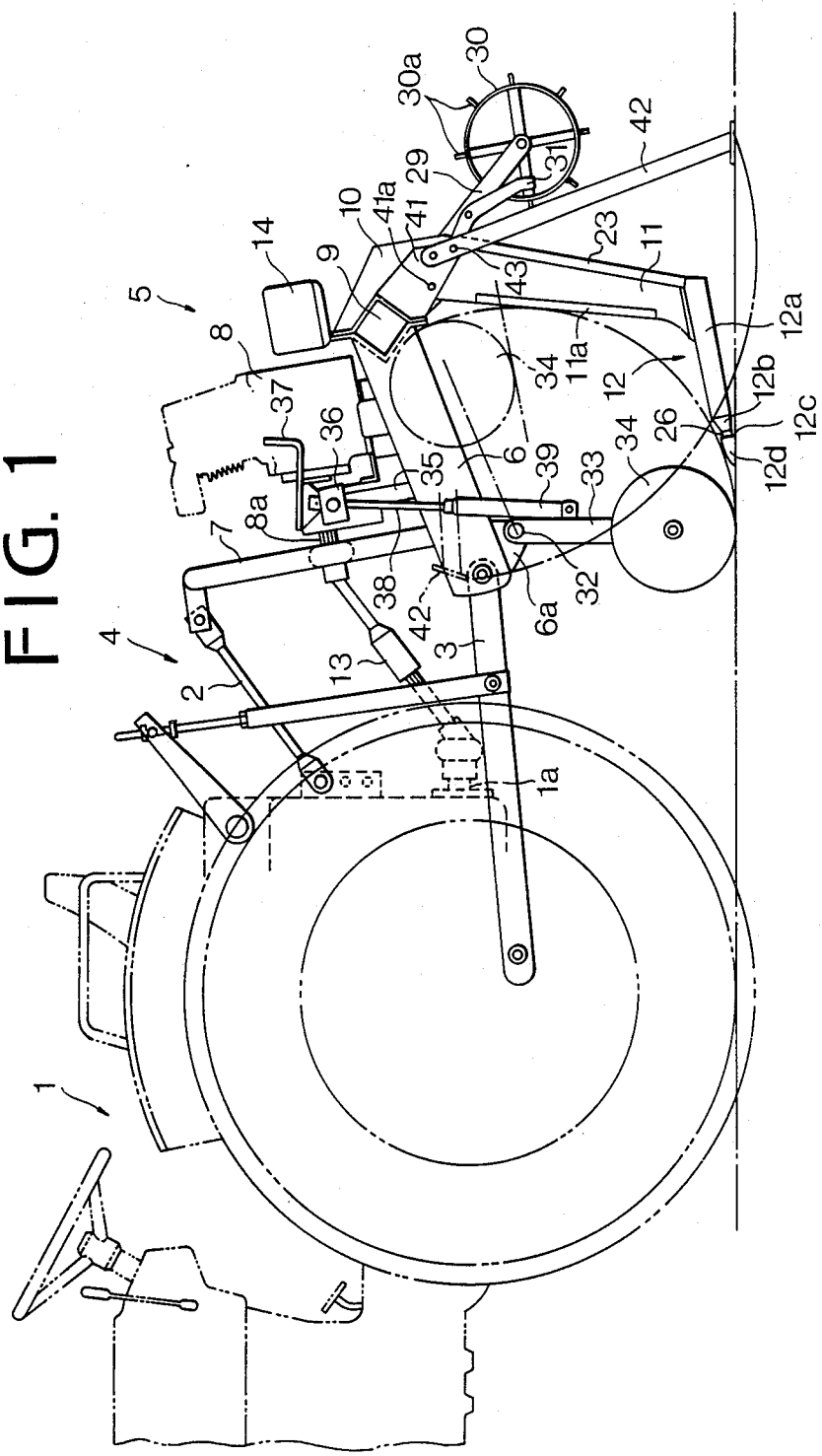
FIG. 1 is a side elevational view of a cultivator according to the present invention.
Figure 2:
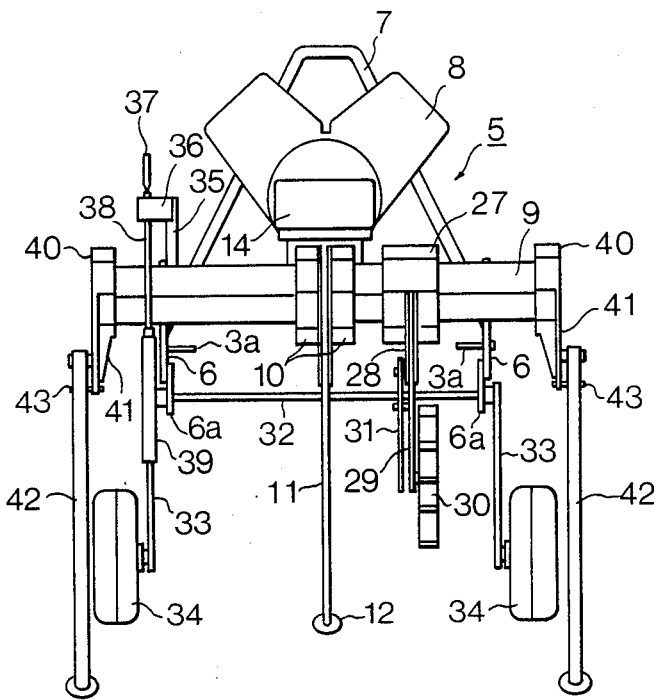
FIG. 2 is an elevation as viewed from the rear of the cultivator of FIG. 1.
Figure 3:
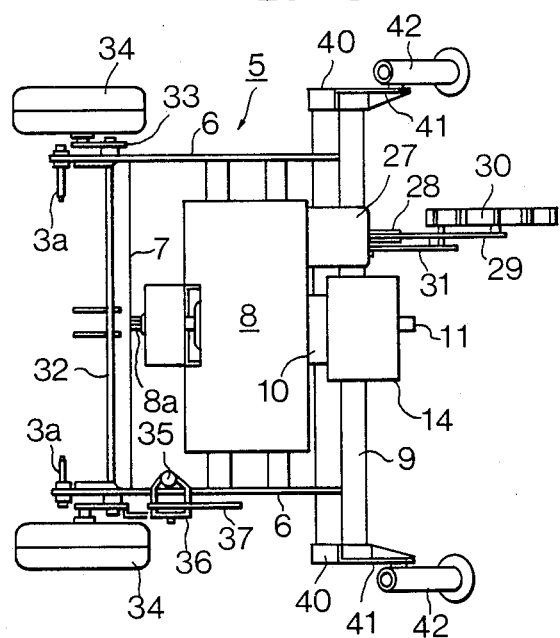
FIG. 3 is a plan view of the machine.

Referring to FIGS. 1 to 3, a tractor 1 is provided with a three-point (hitch) linkage 4 comprising a top link 2 and a pair of lower links 3. The linkage 4 is connected to a cultivator 5 so as to lower and raise the cultivator 5.

Figure 4:
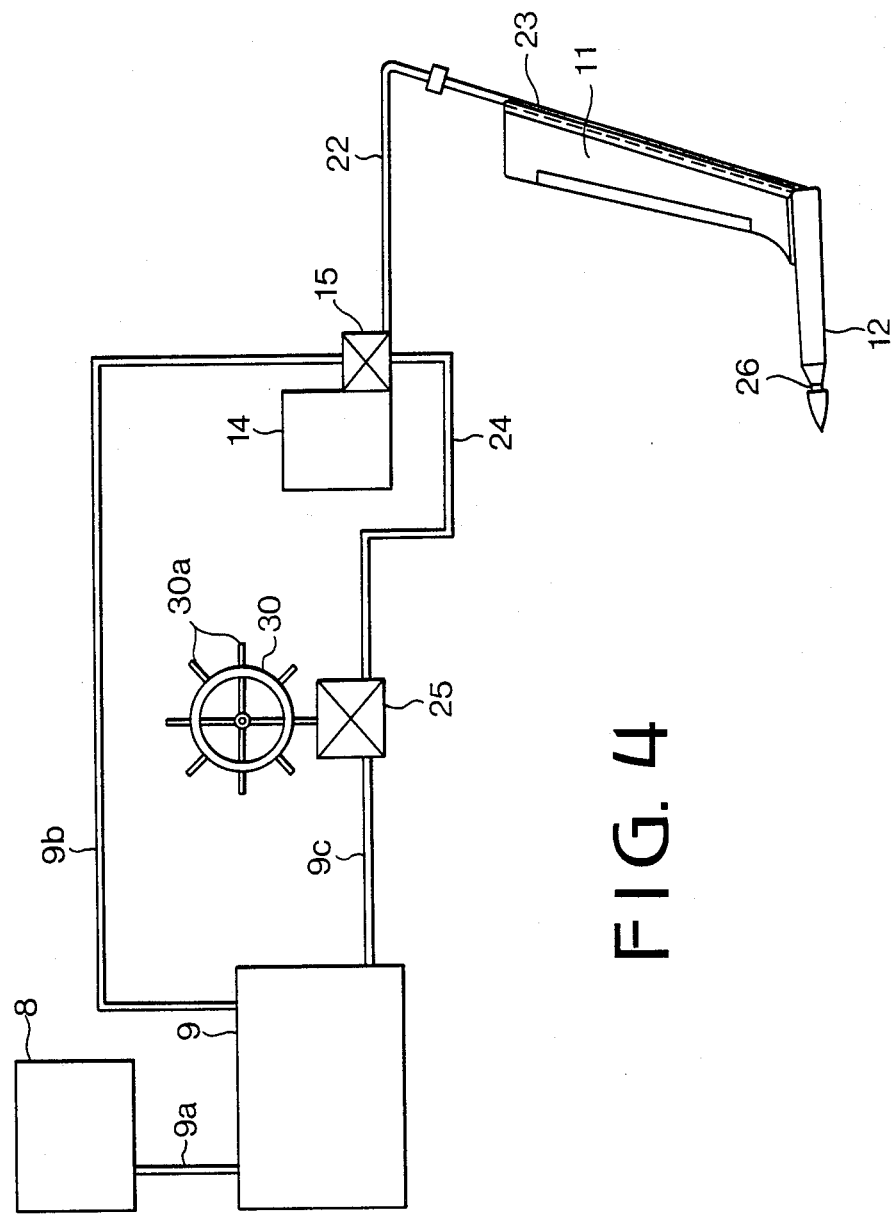
FIG. 4 is a block diagram of an air injection system.

The cultivator 5 has a frame 6 to which a topmast 7 is secured. The topmast 7 is connected to the top link 2 at an upper portion and to the lower links 3 at the lower end by lower link pins 3a. Mounted on the frame 6 is compressor 8, an input shaft 8a of which is connected to a propeller shaft 13 so as to transmit the power from power take-off shaft 1a of the tractor 1. Secured to the rear end of the frame 6 is a main tank 9 having a square cross section, which also serves as a lateral frame member. The main tank 9 is communicated with the compressor 8 by a pipe 9a (FIG. 4).

A downwardly extending blade 11 having an edge 11a at a front portion thereof is secured by way of a holding member 10 to the main tank 9 at the middle portion thereof. An injector 12 is secured to the lower end of the blade and an air-supply pipe 23 communicated with the injector is fixed to the back of the blade 11.

The injector 12 comprises a forwardly extending base portion 12a fixed to the blade 11, a tapered portion 12b formed at the front of the base portion 12a, a neck portion 12c, and a tip portion 12d formed on the front end of the neck portion 12c, an opening 26 being formed in the neck portion 12c. The opening 26 is communicated with the air-supply pipe 23 by a passage (not shown) provided in the tapered portion 12b.

Figure 5:
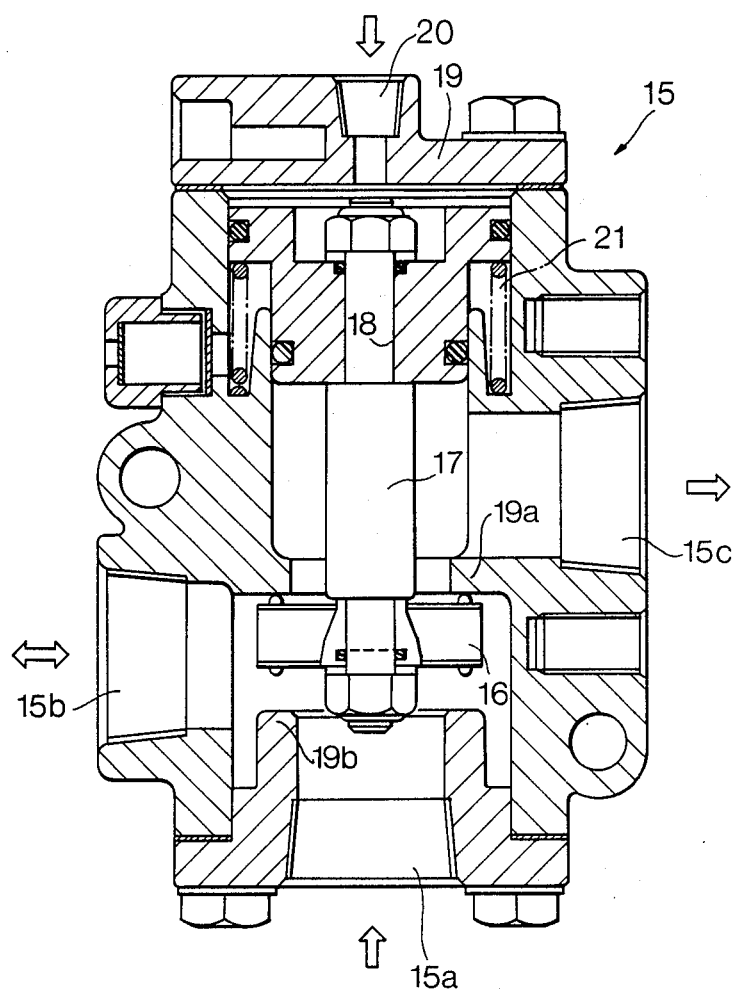
FIG. 5 is a sectional view of a valve of the machine.

A sub-tank 14 is secured to the main tank 9 at a position above the holding member 10. A change-over valve 15 (FIG. 4) provided with three ports is attached to the sub-tank 14. Referring to FIGS. 4 and 5, the change-over valve 15 has a first port 15a communicated with the main tank 9 through a pipe 9b, a second port 15b communicated with the sub-tank 14, a third port 15c communicated with the air-supply pipe 23 of the blade 11 through a pipe 22, and a valve disk 16 for selecting the communication of the ports. The valve disk 16 is secured to one end of a connecting rod 17, to the other end of which a piston 18 is fixed. The piston 18 is housed in a valve body 19 having a pilot port 20 at the upper end thereof. The piston 18 is upwardly urged by a compressed spring 21 to engage the disk 16 with an upper valve seat 19a.

Secured to the main tank 9 at a postion slightly deviated from the center is a holding member 27 (FIG. 2) to which a pair of supporting members 28 is secured. A swing arm 29 which is provided with a gauge wheel 30 is rotatably mounted between the supporting members 28. The engage wheel 30 has an plurality of lugs 30a at certain intervals so as to surely roll on the ground. Mounted on the swing arm 29 is valve 25 (FIG. 4)

which is adapted to be opened and closed by lugs 30a during the rotation of the gauge wheel 30. As shown in FIG. 4, the valve 25 is communicated with the main tank 9 through a pipe 9c and also with the pilot port 20 of the change-over valve 15 through a pupe 24. A brake lever 31 is pivotally mounted on the swing arm 29. The brake lever 31 is adapted to be disengaged from the gauge wheel 30 to allow it to rotate when the gauge wheel 30 is in contact with the ground, that is during operation, and to be engaged with the gauge wheel 30 in order to prevent accidental rotation thereof when the gauge wheel is held above the ground.

A shaft 32 is rotatably supported by brackets 6a which are secured to inner sides of side plates of the frame 6, respectively. Fixed to both ends of the shaft 32 are supporting arms 33, each of which pivotally carries a supporting wheel 34 at the lower end thereof. A supporting plate 35 upwardly projects form the inner side of one of the side plates of the frame 6. Mounted on the plate 35 is a support member 36 in which an upper portion of a screw shaft 38 is rotatably supported. The thread of screw shaft 38 is screwed in a threaded cylinder 39, the lower end of which is pivotally connected to the arm 33 at a middle portion thereof. A handle 37 is fixed to the upper end of the screw shaft 38.

On both ends of the main tank 9, a pair of side plates 41 are provided through supporting members 40, respectively. On each side plate 41, a stand 42 is pivotally mounted and secured to the plate 41 by a removable stop pin 43.

When the wheels 34 and stands 42 are in position shown by solid lines in FIG. 1, the blade 11 and the injector 12 are held above the ground. Accordingly, the injector is not damaged and the cultivator can be easily attached to the tractor 1. Further, since the gauge wheel 30 is locked by the brake lever 31, the valve 25 is not operated.

For the cultivating operation, each stop pin 43 is taken out of its place and the stands 42 are rotated to the front position shown by the chain line in FIG. 1. Each pin 43 is inserted in another hole 41a formed in the side plate 41, passing through the hole of the stand 42 so that the stand is held at the position shown by the chain line in FIG. 1. When the handle 37 is turned to rotate the screw shaft 38, the cylinder 39 is raised, thereby rotating both arms 33 about the axis of the shaft 32. Thus, wheels 34 are moved to the chain line positions adjacent to the blade 11 in the side view of FIG. 1. In their chain line positions, arms 33 and stand 42 are shown to crisscross in their stored position, such that the cultivator is in its operating state.

The cultivator 5 is supplied with power from the tractor 1 through the power take-off shaft 1a to drive the compressor 8. As the tractor 1 advances, the injector 12 is inserted into the soil until the supporting wheels 34 touch the ground. The gauge wheel 30 touches the ground and is surely rolled with aid of by lugs 30a to open and close the valve 25 without failure. When the valve 25 is opened, pipe 9c and 24 are communicated so that a small part of the compressed air stored in the main tank 9 flows into the valve body 19 through the pilot port 20. As a result, the piston 18 moves downwardly to push the valve disk 16 against a lower seat 19b. Accordingly, the communication of second port 15b with the first port 15a is shut off and the port 15b is communicated with the third port 15c. Consequently, compressed air stored in the sub-tank 14 flows to the injector 12 through the pipes 22 and 23 and jets from the opening 26.

When the valve 25 is closed, piston 18 is lifted by spring 21 to close the port 15c and to open the communication between the first port 15a and the second port 15b. Therefore, compressed air flows from the main tank 9 to the sub-tank 14 to be stored therein. Such an operation is intermittently performed so that the deep cultivating of the soil at the areas above the injector 12 is achieved as the blade 11 passes. If the position of the wheels 34 is changed by rotating the handle 37, the depth of the cultivating can be adjusted.

In the above described embodiment, although the wheels 34 and the stands 42 are constructed to rotate around respective pivot points, they may be modified to slide vertically. They are provided in pairs to form a four-point supporting construction, but may also form a three-point supporting construction. Further, the stands 42 can be positioned before the wheels 34.

From the foregoing it will be understood that the present invention provides a cultivator wherein a pair of supporting wheels 34 are disposed immediately in front of the injector so that an accurate adjustment of the cultivating depth can be made. Further, tractional resistance is decreased resulting in a stable operation. When the cultivator is not operated, the wheels and stands support the blade and the injector so that injury to the injector is prevented. Since the cultivator is connected to the tractor at a stable condition supported by the wheels and stands, the attachment of the cultivator can be easily done.

While the presently preferred embodiment of the present invention has been shown and described, it is to be understood that this disclosure is for the purpose of illustration and that various changes and modifications may be made without departing from the scope of the invention as set forth in the appended claims.

We claim:

1. In a cultivator having a frame, a linkage for connecting the frame to a tractor, at least one blade secured to the frame, the blade projecting downwardly from the frame and having an edge at a forward side thereof, an injector provided at a lower portion of the blade, and a passage for supplying compressed air to the injector for injecting compressed air into soil, the improvement comprising an apparatus for supporting the cultivator, the apparatus comprising:

a pair of supporting wheels positioned immediately in front, with respect to a longitudinal direction of the cultivator, of the injector in a supporting state;

means for adjustably elevating the supporting wheels to lower the injector to adjustable cultivating positions;

at least one stand connected to the frame so as to be retractable to an upper position from a lower position thereof, said lower position being in the supporting state;

the supporting wheels and the stand being arranged to hold the injector above the ground in the supporting state;

each of the supporting wheels is provided on a supporting arm pivoted to the frame;

said supporting arms are adjustably pivotable rearwardly and upwardly from said supporting state into an operating state of the cultivator by said means, and the stand is pivotally connected on the frame so as to be forwardly upwardly retractable from said supporting state into said upper position thereof in the operating state of the cultivator, said supporting arms and said stand, criss-crossing in a stored position in said operating state.

2. The apparatus according to claim 1 wherein the means comprises extensible screw means and a handle for operating the screw means.

3. The apparatus according to claim 1, wherein the stand is secured to the frame by a pin removably engaging with a hole formed in the frame.

4. The apparatus according to claim 1, wherein
each of said supporting wheels are positioned substantially laterally with respect to and on opposite sides of the injector in said supporting state; and
said means for adjustably elevating the supporting wheels comprises:
a horizontal shaft rotatably mounted with respect to said frame;
said supporting arms each operatively connected to a respective end of said shaft;
said means further comprises:
a screw shaft having a handle and rotatably mounted with respect to said frame;
a threaded cylinder connected to one of said supporting arms at a position thereon between a corresponding one of said supporting wheels and said horizontal shaft; and
said screw shaft threadably engages said threaded cylinder.

5. The apparatus according to claim 1, wherein
said at least one stand comprises two stands which extend rearwardly of said injector positioned substantially laterally with respect to and on opposite sides of the injector in said supporting state.

* * * * *